Feb. 1, 1944.   L. T. CONDE   2,340,454
MILKING MACHINE
Filed March 20, 1940   2 Sheets-Sheet 1

INVENTOR.
Lyall T. Conde
BY James Harrison Bowen
ATTORNEY.

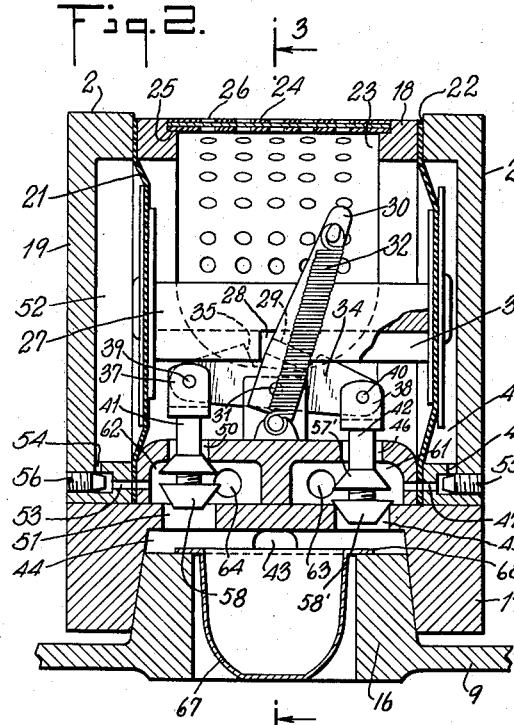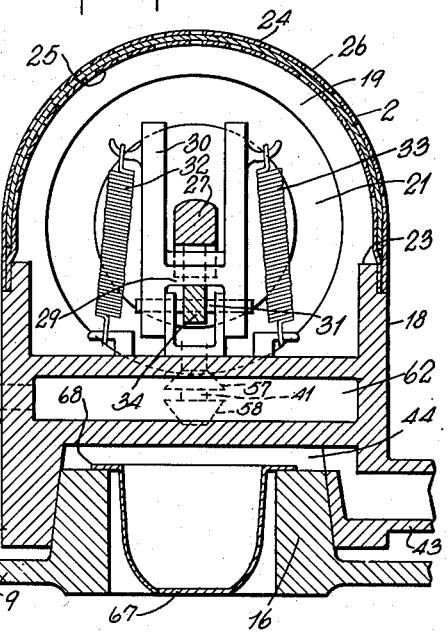

Patented Feb. 1, 1944

2,340,454

UNITED STATES PATENT OFFICE 2,340,454

MILKING MACHINE

Lyall T. Conde, Sherrill, N. Y.

Application March 20, 1940, Serial No. 324,951

12 Claims. (Cl. 31—62)

This invention relates to milking machines and more especially to a milking machine pulsator for controlling the application of suction and atmospheric pressure to the teat cups.

An object of the invention is a pulsator in which valve wear is substantially eliminated thereby prolonging the useful life of the pulsator.

A further object of the invention is a pulsator of simple construction, low cost, high efficiency and long life.

A pulsator embodying this invention comprises a housing containing a pair of chests each having a port leading to atmosphere and a port leading to a vacuum source with the area of the vacuum source port preferably being greater than the area of the atmosphere port. Each chest is provided with a valve adapted to close either port with the remaining port open and each valve is connected to one end of a rocker which is oscillatable between two valve-seating positions. An oscillatable member is arranged transversely of the rocker and has a bar portion overlying the rocker for movement into engagement therewith upon oscillation of the member to tilt the rocker. This member is oscillated by means responsive to pressure conditions in the chests, which means has a lost-motion connection with the said member. Preferably, spring means are connected to said member in such manner as to snap the member to either side as it passes dead-center.

In the pulsator just described, the valves are started from one seating position to the other seating position by impact of the bar portion of the oscillatable member against the rocker. The valves are retained in their seated positions after being moved thereto by a pressure differential on the vacuum port valve due to the fact that the area of the vacuum ports is greater than the area of the atmosphere ports.

Other features and advantages of the invention will appear from the following description taken in connection with the drawings, wherein:

Fig. 2 shows a vertical longitudinal section through the pulsator with the rocker as well as the oscillatable member in their extreme right-hand positions;

Fig. 3 shows a cross-section substantially on the line 3—3 of Fig. 2;

Fig. 4 shows a vertical longitudinal section through the pulsator with the rocker in its extreme left-hand position and the oscillatable member arranged slightly clockwise from its extreme left-hand position;

Fig. 5 shows an enlarged fragmentary view similar to Fig. 4 partially broken away.

Figure 1:
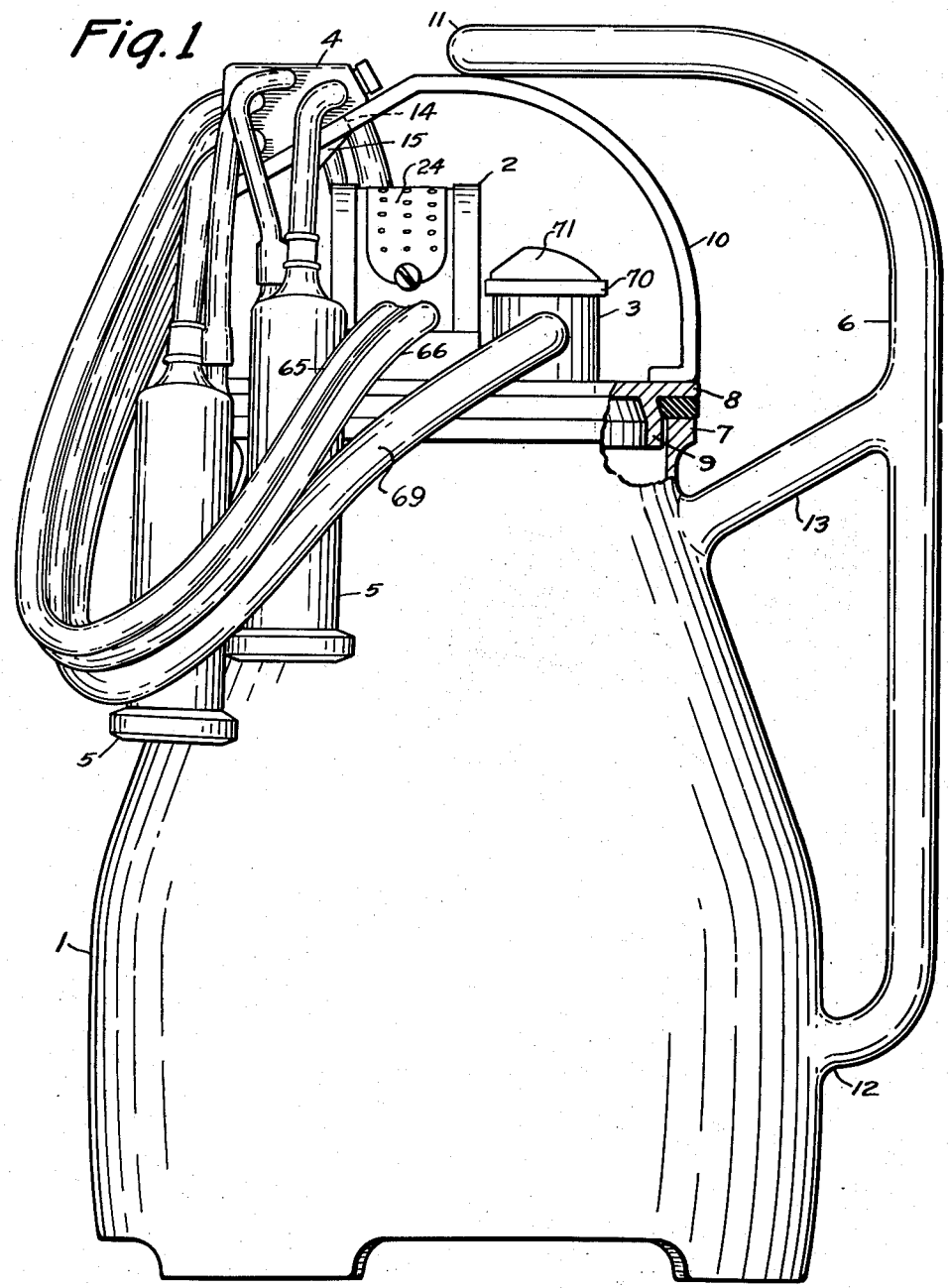
Figure 1 shows a side elevation of the complete milking unit with part broken away showing the downwardly extending flange of the cover.

In the drawings the milking unit is shown as it would be made wherein numeral 1 indicates a milk pail, numeral 2 a pulsator, numeral 3 a milk spigot, numeral 4 the claw, numeral 5 the teat cups, and numeral 6 a rigid handle.

The pail 1 may be of any type or design, however in the design shown it is large at the bottom with the walls sloping inward in a conical shape toward the upper end and at the top is a flange 7 upon which a cover 8 is positioned with a gasket therebetween. The cover is provided with a downwardly extending flange 9 locating and centering it in the pail and at the same time cooperating with the stationary handle 6 for locking the cover in place. The cover plate 8 is provided with a stationary bail or handle 10 and it will be noted that the upper end 11 of the handle 6 extends over to the center of the pail and over the handle 10 thereby, with the flange 9, securing the cover in place. The handle 6 extends outward from the pail at the point 12 at the lower end and is connected to the upper part by a brace 13, and it will be noted that the upper end continues upward and is curved over to the center of the pail at the top. This arrangement of the handle and cover makes it possible to use a relatively large opening for the pail, which is desirable, and at the same time to carry the pail by the rigid handle with the pail upright. It will be understood, however, that this handle may be of any shape or design, and may be attached to the pail at any other point or points. The handle 10 is provided with a slot 14 to accommodate a tongue 15 of the claw 4, and the cover 8 is provided with an opening for the spigot 3 and a boss 16 is provided on the cover over which the pulsator 2 is placed.

The pulsator is formed with a base 17 having a sloping inner surface corresponding with a similarly shaped outer surface on the boss 16 so that it fits thereover as shown in Figures 2 and 3, and above the base is an intermediate section 18 and two end sections 19 and 20 which are attached thereto with diaphragms 21 and 22 therebetween. The section 18 has an opening 23 therein and this is covered with two perforated sheets or wire mesh as indicated by the numerals 24 and 25 with filtering material therebetween as indicated by the numeral 26. The filter keeps cow hair and dirt of all description out of the reversing mechanism and valves in the pulsator, and also out of the atmospheric pressure line or twin air tubes between the inflations and shells. The diaphragms are attached to the ends of a cross bar 27 and this has a notch 28 at the center through which a cross bar 29 of an H 30 passes, the notch being of greater length than the width of the bar 29 to provide a lost-motion connection between the arm 30 and the bar 27. It will be noted that with the H pivotally mounted at the point 31, springs 32 and 33 will snap the H over the center as it passes from one side to the other when the bar 27 is moved backward and forward by the diaphragms. A rocker 34 is also pivotally mounted at the point 31 and this also has a notch 35 through the upper edge thereof through which the cross bar 29 of the H also passes and this will be operated by the bar 29 as the bar 29 is moved by the bar 27. The upper edge of the rocker 34 extends upward into a slot 36 in the lower edge of the bar 27, and the ends of the rocker are pivotally held in yokes 37 and 38, by pins 39 and 40, at the upper ends of valve stems 41 and 42, which respectively carry a pair of valves 57 and 58 and a pair of valves 57' and 58' of which 57 and 58' seat simultaneously and 58 and 57' seat simultaneously in both the upward and downward movement thereby controlling the vacuum and atmospheric pressures in the atmospheric pressure line which causes the massage and squeeze and also the pressures to the diaphragms. The valves 57 and 57' are fixed on the valve stems while the valves 58 and 58' are adjustable on said stems. In this pulsator the same valve mechanism serves two purposes at the same time. It actuates the diaphragms and associated mechanism and also builds up a vacuum in the atmospheric pressure line and between the inflations and shells, causing the inflation to remain open when the milk spigot is turned on and the cups are on the cow teats. When the valve mechanism reverses to the opposite position, atmosphere is admitted which builds up the pressure in the cavity between the inflations and shells when the milk spigot is turned on and the cups are on the teats.

The base 17 of the pulsator is provided with a stanchion air tube or vacuum connection 43 that communicates with an area 44 between the boss on the cover and base thereby providing vacuum under the valves, and air at atmospheric pressure is supplied through the filter to the area above the valves.

Figs. 4 and 5 illustrate one arrangement of the parts of the pulsator during an operation under the influence of reduced or sub-atmospheric pressure produced in the area 44 due to its connection with the vacuum source. It will be noted that the valve 58 is seated, closing a port 51 to the vacuum source and the valve 57 is not seated, opening a port 50 to the atmosphere, so that air at atmospheric pressure may pass through the ports 53 and 54 to the area 52 behind the diaphragm 21. Furthermore, the valve 57' is seated, closing a port 46 to the atmosphere and valve 58' is not seated, opening a port 45 to the vacuum source. The atmosphere openings or ports 46 and 50 are of the same area as each other, while the vacuum openings or ports 45 and 51 are of the same area as each other but of larger area than the atmosphere ports. With the valves in the position shown in Fig. 4, the valve 58 will have atmospheric pressure above and sub-atmospheric pressure below it and so will the valve 57'. The effect of this pressure difference is to cause forces pulling downward on both ends of the rocker 34. The downward force on the left end of the rocker is greater and thus prevails in holding the valves 58 and 57' on their seats. This is the case because, as shown in Figs. 2 and 4, the ports 45 and 51 are of greater cross-section than the ports 46 and 50. It follows that a greater downward force is effected on the valve 58 than on the valve 57'. Friction also tends to maintain the valves in the position shown in Fig. 4 but the pressure difference insures positive maintenance in such position until the rocker 34 is tilted by the H-member 30.

At the start of the cycle of operation, air pressure is reduced in the area or chamber 49 behind or to the right of the diaphragm 22 and when the reduced pressure reaches a predetermined degree, the two diaphragms 21 and 22 with the connecting bar 27 will be moved to the right because the inside or left-hand face of diaphragm 22 is subjected to atmospheric pressure, which, of course, is in excess of the reduced pressure in chamber 49 effective against the outside or right-hand face of diaphragm 22. By reason of the engagement of the bar 29 with the left-hand wall of the slot 28 in bar 27, the H-member is moved over slowly to the right until its upper end passes dead center when the springs 32 snap the H-member over to bring the right edge of the bar 29 into engagement with the right wall of the notch 35 in rocker 34 with sufficient force to tilt the rocker clockwise and start to move the valves 41 and 42 away from the position shown in Figs. 4 and 5 and also to bring the right edge of the bar 29 into engagement with the right wall of the slot 28 in bar 27. After the rocker and valves have been started away from their Fig. 4 position they proceed to their reverse positions. The valves 57 and 58' remain seated because of similar but reversed pressure conditions in chests 61 and 62 to those previously described and resulting from the greater area of the suction ports than the area of the atmosphere ports. The valve mechanism now awaits a blow from the bar 29 toward the left in response to which the same series of events takes place as just described and for the same reasons except that in this reverse direction the conditions and actions in chests 61 and 62 are reversed. This brings the valves back to the position shown in Fig. 4 and the above-described action is then reversed. The alternate action continues as long as the device is in use with the connection to the vacuum source open.

The velocity of the air and vacuum into and from the areas 49 and 52 may be controlled by the sizes of the connecting orifices 47 and 48 on one side and 53 and 54 on the other and these may be regulated by screws 55 and 56 or any suitable means. Usually milking machines operate at a frequency of at least 50 cycles per minute and preferably the orifices are adjusted for such operational rate. Each cycle, therefore, consumes approximately one second so that each valve remains seated approximately one-half second between operations of the rocker 34 by the arm 30.

Between the vacuum openings 45 and 51 and the openings 46 and 50 are chambers or chests 61 and 62 which provide communicating means between the vacuum and atmosphere and the areas behind the diaphragms at one instant and also the cavity between the inflations and shells at another. These chambers are provided with nipples 63 and 64 extending therefrom and it will be noted that first chest 61 is open to the atmosphere while chest 62 is open to the vacuum, and then chest 61 is open to the vacuum while chest 62 is open to the atmosphere. With the nipples respectively connected to the claw by tubes 65 and 66 and with the claw connected to the teat cup shells it is possible to alternate the milking action, with the vacuum drawing milk from two teats while the other two are being massaged by the atmospheric pressure. When the pulsator operates the first two teats are massaged while the other two are milked by the vacuum, and the same motion actuates the mechanism through the diaphragms that shifts the vacuum and atmospheric pressure from one to the other.

Below the pulsator is a thin metal moisture cup 67 with a flange 68 at the top by which the cup is supported on top of the boss 16 on the cover 8 of the pail. Warm air and vapor from the inside of the pail naturally rise and are taken out through the opening in the boss 16 into which the moisture cup fits. The under side of the moisture cup acts as a condensing unit so this vapor and that part of the vapor that is not condensed and may condense between the top of the cup and the bottom of the pulsator or in the stanchion air tube will be caught in the moisture cup when the stanchion air tube is removed from the stall cock. This cup is positioned to catch condensation or any moisture that may accumulate in the stanchion air tube from the pulsator to the pipe line, and as this moisture often contains bacteria it is necessary to prevent it reaching the milk. This cup also provides a breather or equalizer as when the vacuum on the lower side is lower than that on the upper it will move upward as shown in Figure 4, whereas otherwise it forms a seal.

The milk spigot 3 may be formed of glass, a plastic, or other transparent material and this has a nipple over which a tube or hose 69 may be placed and a plug 70. The plug, only, may be made of transparent material with the housing of metal, or both the plug and housing may be of transparent material as may be desired. The plug is provided with a web or fin 71 by which it may be turned.

It will be understood that changes may be made in the construction without departing from the spirit of the invention. One of which changes may be in the shape or design of the pulsator casing, another may be in the use of other means for providing a filter, another may be in the use of other means for mounting the moisture cup, another may be in the use of other means for connecting the diaphragms to the valves, and still another may be in the use of spigots, claws, or handles of any other types or designs.

The construction will be readily understood from the foregoing description. In use the milking unit may be provided as shown and described and with the nipple 43 connected to the stanchion air tube and the teat cups on the teats the device will operate continuously and alternately draw milk from two teats while the other two are being massaged, and as hereinbefore described the action may be speeded up or reduced as may be desired.

With the device formed in this manner it provides a neat compact unit and with a rigid handle of this type the pail is balanced and the operator may readily empty the pail with one hand.

The condenser cup herein shown and described is claimed in applicant's co-pending application, Serial No. 425,917, filed January 7, 1942.

Having thus fully described the invention what I claim as new and desire to secure by Letters Patent, is:

1. A milking machine pulsator comprising a pair of chests each having a port leading to atmosphere and a port leading to a vacuum source, the area of said vacuum source port being greater than the area of said atmospheric port, lift valve means for each chest adapted to close either port with the remaining port open, a rocker having each end connected to one valve means and oscillatable between two valve-seating positions, an oscillatable member arranged transversely of said rocker and having a portion thereof overlying said rocker for movement into engagement therewith upon oscillation of said member to tilt said rocker, means responsive to pressure conditions in said chests to oscillate said member, and spring means opposing movement of said member toward its center position and effective to snap said member to either side as it passes said center position.

2. A milking machine pulsator comprising a pair of chests each having a port leading to atmosphere and a port leading to a vacuum source, the area of said vacuum source port being greater than the area of said atmosphere port, lift valve means for each chest adapted to close either port with the remaining port open, a rocker having each end connected to one valve means and oscillatable between two valve-seating positions, an oscillatable member arranged transversely of said rocker and having a portion thereof overlying said rocker for movement into engagement therewith upon oscillation of said member to tilt said rocker, a bar having lost-motion connection with said member, means responsive to pressure conditions in said chests to vibrate said bar, and spring means opposing movement of said member toward its center position and effective to snap said member to either side as it passes said center position.

3. A milking machine pulsator comprising a pair of chests each having a port leading to atmosphere and a port leading to a vacuum source, the area of said vacuum source port being greater than the area of said atmosphere port, lift valve means for each chest adapted to close either port with the remaining port open, a rocker having each end connected to one valve means and oscillatable between two valve-seating positions, an oscillatable member arranged transversely of said rocker and having a portion thereof overlying said rocker for movement into engagement therewith upon oscillation of said member to tilt said rocker, a bar having a notch receiving said portion, means responsive to pressure conditions in said chest to vibrate said bar, and spring means opposing movement of said member toward its center position and effective to snap said member to either side as it passes said center position.

4. A milking machine pulsator comprising a pair of chests each having a port leading to atmosphere and a port leading to a vacuum source, the area of said vacuum source port being greater than the area of said atmospheric port, lift valve means for each chest adapted to close either port with the remaining port open, a rocker having each end connected to one valve means and oscillatable between two valve-seating positions, an oscillatable member arranged transversely of said rocker and having a portion thereof overlying said rocker for movement into engagement therewith upon oscillation of said member to tilt said rocker, a pair of chambers each having a diaphragm constituting one wall, a passageway connecting each chamber with a chest, a bar connecting said diaphragms and having a lost-motion connection with said member, and spring means opposing movement of said member toward its center position and effective to snap said member to either side as it passes said center position.

5. A milking machine pulsator comprising a pair of chests each having a port leading to atmosphere and a port leading to a vacuum source, the area of said vacuum source port being greater than the area of said atmospheric port, lift valve means for each chest adapted to close either port with the remaining port open, a rocker having each end connected to one valve means and oscillatable between two valve-seating positions, an oscillatable member arranged transversely of said rocker and having a portion thereof overlying said rocker for movement into engagement therewith upon oscillation of said member to tilt said rocker, a pair of chambers each having a diaphragm constituting one wall, a passageway connecting each chamber with a chest, a bar connecting said diaphragms and having a notch receiving said portion, and spring means opposing movement of said member toward its center position and effective to snap said member to either side as it passes said center position.

6. A milking machine pulsator comprising a pair of chests each having a port leading to atmosphere and a port leading to a vacuum source, lift valve means for each chest adapted to close either port with the remaining port open, a rocker having each end connected to one valve means and oscillatable between two valve-seating positions about a pivot at right angles to the direction of the valve means travel, an oscillatable member arranged transversely of said rocker and having a portion thereof overlying said rocker for movement into engagement therewith upon oscillation of said member to tilt said rocker, a bar having a lost-motion connection with said member, means responsive to pressure conditions in said chests to vibrate said bar, and spring means opposing movement of said member toward its center position and effective to snap said member to either side as it passes said center position.

7. A milking machine pulsator comprising a pair of chests each having a port leading to atmosphere and a port leading to a vacuum source, lift valve means for each chest adapted to close either port with the remaining port open, a rocker having each end connected to one valve means and oscillatable between two valve-seating positions about a pivot at right angles to the direction of the valve means travel, an oscillatable member arranged transversely of said rocker and having a portion thereof overlying said rocker for movement into engagement therewith upon oscillation of said member to tilt said rocker, means responsive to pressure conditions in said chests to oscillate said member, and spring means opposing movement of said member toward its center position and effective to snap said member to either side as it passes said center position.

8. A milking machine pulsator comprising a pair of chests each having a port leading to atmosphere and a port leading to a vacuum source, lift valve means for each chest adapted to close either port with the remaining port open, a rocker having each end connected to one valve means and oscillatable between two valve-seating positions about a pivot at right angles to the direction of the valve means travel, an oscillatable member arranged transversely of said rocker and having a portion thereof overlying said rocker for movement into engagement therewith upon oscillation of said member to tilt said rocker, vibrating means responsive to pressure conditions in said chests and having a lost-motion connection with said member, and spring means opposing movement of said member toward its center position and effective to snap said member to either side as it passes said center position.

9. A milking machine pulsator comprising a pair of chests each having a port leading to atmosphere and a port leading to a vacuum source, the area of said vacuum source port being greater than the area of said atmospheric port, lift valve means for each chest adapted to close either port with the remaining port open, a rocker having each end connected to one valve means and oscillatable between two valve-seating positions, an oscillatable member arranged transversely of said rocker and having a portion thereof overlying said rocker for movement into engagement therewith upon oscillation of said member to tilt said rocker, vibrating means responsive to pressure conditions in said chests and having a lost-motion connection with said member, and spring means opposing movement of said member toward its center position and effective to snap said member to either side as it passes said center position.

10. A milking machine pulsator comprising a pair of chests each having a port leading to atmosphere and a port leading to a vacuum source, lift valve means for each chest adapted to close each port with the remaining port open, a rocker having each end connected to one valve means and oscillatable between two valve-seating positions about a pivot at right angles to the direction of the valve means travel, an oscillatable member arranged transversely of said rocker and having a portion thereof overlying said rocker for movement into engagement therewith upon oscillation of said member to tilt said rocker, a bar having a notch receiving said portion and being of greater extent than the width of said portion, means responsive to pressure conditions in said chests to vibrate said bar, and spring means opposing movement of said member toward its center position and effective to snap said member to either side as it passes said center position.

11. A milking machine pulsator comprising a pair of chests each having a port leading to atmosphere and a port leading to a vacuum source, lift valve means for each chest adapted to close either port with the remaining port open, a pair of chambers each having a diaphragm constituting one wall, a passageway connecting each chamber with a chest, a bar connecting said diaphragms and having a notch, a pivoted member arranged transversely of said bar and having a portion of less width than the extent of said notch extending thereinto, a rocker oscillatable about a pivot at right angles to the direction of the valve means travel and underlying said portion for engagement thereby upon oscillation of said member to tilt said rocker, means connecting each end of said rocker to one of said valve means, and spring means opposing movement of said member toward center position and effective to snap said member to either side as it passes said center position.

12. A milking machine pulsator comprising a pair of chests each having a port leading to atmosphere and a port leading to a vacuum source, lift valve means for each chest adapted to close either port with the remaining port open, a pair of chambers each having a diaphragm constituting one wall, a passageway connecting each chamber with a chest, a bar connecting said diaphragms, a pivoted member arranged transversely of said bar and having a lost-motion connection therewith, a rocker oscillatable about a pivot at right angles to the direction of the valve means travel and underlying a portion of said member for engagement by said portion upon oscillation of said member to tilt said rocker, means connecting each end of said rocker to one of said valve means, and spring means opposing movement of said member toward its center position and effective to snap said member to either side as it passes said center position.

LYALL T. CONDE.